United States Patent

[11] 3,615,559

| [72] | Inventors | Alfred F. Kaspaul;<br>Erika E. Kaspaul, both of Malibu, Calif. |
|---|---|---|
| [21] | Appl. No. | 717,503 |
| [22] | Filed | Apr. 1, 1968 |
| [45] | Patented | Oct. 26, 1971 |
| [73] | Assignee | Hughes Aircraft Company<br>Culver City, Calif. |

[54] HYDROPHOBIC COMPOSITION RENDERED HYDROPHILIC BY PHOTON EXPOSURE
3 Claims, 4 Drawing Figs.

[52] U.S. Cl. .................................................... 96/88,
96/36, 96/67, 96/33
[51] Int. Cl. ...................................................... G03c 1/00,
G03c 5/00
[50] Field of Search ......................................... 96/67, 1,
1.8, 48, 88; 117/37 LX

[56] References Cited
UNITED STATES PATENTS
2,997,387  8/1961  Tanenbaum ..................  96/1.8
3,197,307  7/1965  Blake et al. ...................  96/1.8
3,285,741  11/1966 Gesierich et al. .............  96/1
3,383,209  5/1968  Cassiers et al. ...............  117/37 LX Primary Examiner—Norman G. Torchin
Assistant Examiner—John Winkelman
Attorneys—James K. Haskell and Allen A. Dicke, Jr.

ABSTRACT: A composition comprising a resinous film forming binder, a photoconductive or photoemissive material, e.g., ZnO, a metallic sensitization enhancing compound, e.g., CuCl, and a formaldehyde-water mixture, which composition is normally hydrophobic. An article, comprising the composition coated on a substrate, is exposed to suitable light whereupon the exposed areas become hydrophilic. Treatment of the exposed article with a dye or pigment in water solution or suspension results in a usable pattern in accordance with the image areas. Selective etching of a metallic substrate by water soluble etchants is also disclosed.

PATENTED OCT 26 1971 3,615,559

Alfred F. Kaspaul,
Erika E. Kaspaul,
INVENTORS.
BY.

ALLEN A. DICKE, Jr.,
AGENT

PATENTED OCT 26 1971             3,615,559
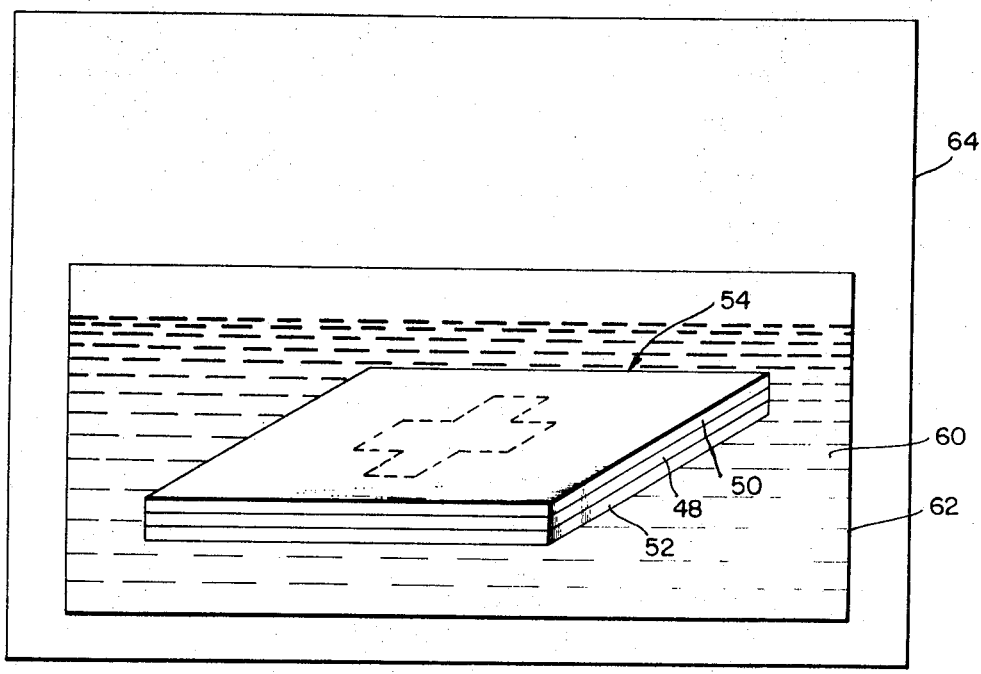
Fig. 3.
Fig. 4.
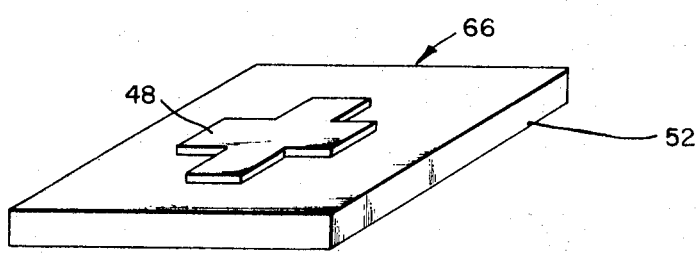
Alfred F. Kaspaul,
Erika E. Kaspaul,
INVENTORS.
BY.
ALLEN A. DICKE, Jr.,
AGENT.

HYDROPHOBIC COMPOSITION RENDERED HYDROPHILIC BY PHOTON EXPOSURE

BACKGROUND

This invention is directed to an article which comprises a sensitive composition on a substrate which composition is selectively sensitive to water carried materials after exposure to photon energy.

The prior art abounds with photon sensitive materials which are selectively sensitive after selective exposure. Included in this broad definition are the silver halide materials of the ordinary photographic art. However, this invention is more restrictive than that, in that the medium is selectively sensitive to water carried materials, and it is particularly sensitive to the deposition or removal of materials from the selectively sensitive area. In the deposition, dyes or colored pigments can be added from making visible the areas related to the selectively photon exposed areas. This of course makes visual appearing areas, which can convey information.

The prior art also includes the direct deposition of electrically charged pigments or dyes onto a photoconductive media such as zinc oxide in a suitable binder coated upon a support, such as paper. Furthermore, indirect transfer processes are used in the prior art wherein a photoconductive drum is exposed, electrically charged pigments deposited thereon, followed by transfer of the pigment to paper. In other prior art, pigments are deposited from a colloidal suspension onto a zinc oxide coated paper. Furthermore, other processes employ cathodic reduction of metal salts by conductivity changes when they are positioned in a photoconductive matrix and then selectively exposed. This is similar to the silver halide process, except that the cathodic reduction takes place without the same type of development as in the silver halide processes. Still other prior art includes the electrodeposition of dyes upon materials in selective manner. Still other prior art includes the anodic oxidation of black metal films on a white photoconductive media to result in image production. Each of these prior art articles for image production is fairly complex, for they require charged particles, high-current or high-voltage supply for moving the dyes or pigments.

SUMMARY

It can be stated in essentially summary form that this invention is directed to a composition which is made sensitive to water carried materials in selective areas by photon exposure. The article comprises a sensitive material, a sensitization enhancing material and a hydrophobicity inducing agent in a film forming binder.

The utility of this composition is that the composition is hydrophobic, except when photon exposed, and the selective exposure makes the composition hydrophilic. At that point water carried materials which can be dyes or pigments in water, are selectively deposited or adsorbed in the sensitized areas. However, the water carried materials can be other materials which act upon the composition in accordance with the area rendered hydrophilic through photon exposure. In the latter case, etchants can be used to selectively etch the composition and sometimes the supporting substrate in accordance with the photon sensitized area.

Accordingly, it is an object of this invention to provide a composition which is selectively sensitizable by photon and/or electron exposure to affect the hydrophobicity of the composition so that water carried materials can selectively act upon the composition in accordance with the photon exposure. It is a further object of this invention to provide a composition which is hydrophobic until it is photon exposed, which exposure renders the exposed area hydrophilic so that water carried materials can act on the exposed area. It is a further object of this invention to provide dyes in water so that they act upon the hydrophilic areas of the exposed composition. It is still another object to provide etchants in water, which etchants are controlled by the hydrophobicity of selected areas of the composition so that the etching of the composition or the supporting substrate by the etchant occurs in the selected pattern in accordance with photon exposure. Other objects and advantages of this invention will become apparent from a study of the following portion of the specification, the claims and the attached drawings.

DESCRIPTION OF THE DRAWINGS

FIG. 3 illustrates a succeeding step of the process.

FIG. 4 illustrates the finished part resulting from the process.

DESCRIPTION

Figure 1:
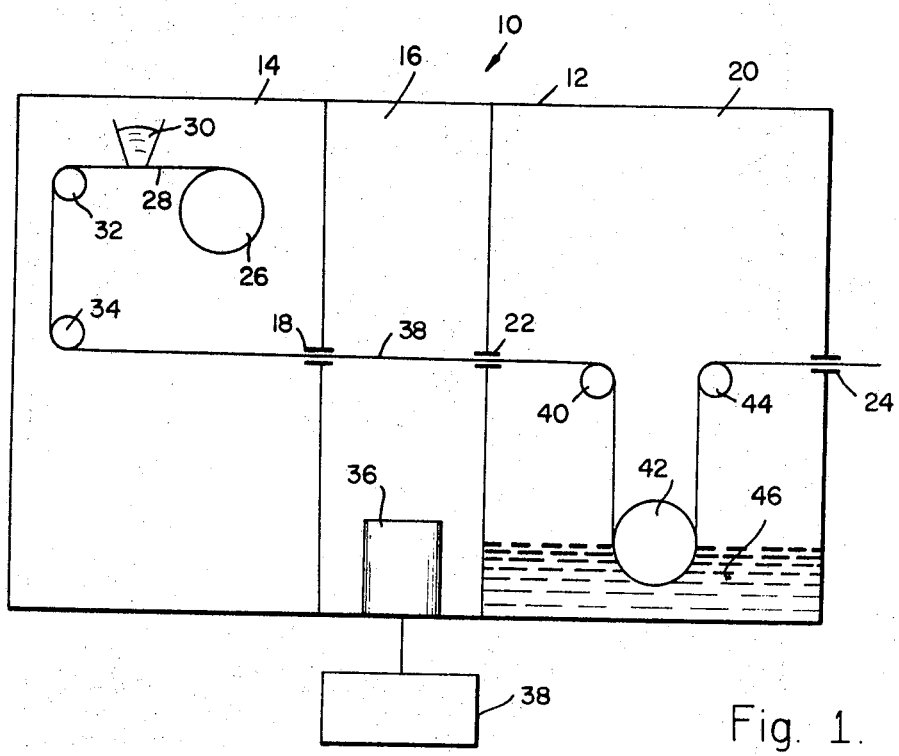
FIG. 1 is a schematic elevational view, with the front housing cover removed, of a device which employs the article including coating a web, selectively photon exposing the article and developing it in accordance with the selective area sensitivity of the composition to water carried materials.

Referring to FIG. 1, a device which employs the composition and acts upon it so that selective area sensitivity is effected so that the composition is selectively acted upon by water carried materials is generally indicated at 10. The device 10 comprises a housing 12, which is preferably lighttight because of the photon sensitive character of the composition employed therein. However, for illustration, the near side cover has been removed so that the interior can be seen. Housing 12 contains chamber 14 which acts as a storage chamber for the composition, and if desired, a coating chamber to coat the composition onto a substrate to produce a coated article. Chamber 14 is connected to chamber 16 through light trap 18. Similarly, chamber 16 is connected to chamber 20 through light trap 22, and the article leaves chamber 20 through light trap 24.

Storage reel 26 furnishes a supply of substrate 28 which is led under coater 30 to produce the coated article and around guide reels 32 and 34 so that it can pass out of chamber 14 through trap 18.

Substrate 28 does not enter into the activity of the photon sensitive composition except to act as a supporting structure, substrate or carrier therefore whose role is entirely passive as far as the practice of the invention is concerned. Suitable support substrates may be formed of almost any material and may partake of almost any geometry. Thus, paper and especially paper in the form of a tape, may serve as a suitable support substrate and is particularly desirable because of its flexibility. A number of synthetic polymer composition materials are also suitable. For example, acetate films, methyl methacrylate, cellulose acetate and the like are suitable. While the supporting substrate in the present illustration is flexible so that it can pass around the guide rolls, such is merely for the convenience of storage, and rigid substrates can just as well be used, providing the equipment is suitably designed for the employment thereof. Such rigid substrates can be synthetic polymer composition material, impregnated phenolic and the like, or may be of metal or glass.

The article of this invention is the photon sensitive composition deposited upon the supporting substrate. The composition comprises a material which is sensitive to the impingement of photons, a metallic compound which is a sensitization enhancing agent, and a material which selectively renders the medium hydrophobic or hydrophilic in accordance with the photon exposure. These materials are in a film forming binder. In some cases, where the binder strength is sufficient, no supporting substrate is necessary, but the binder itself provides a self supporting structure.

A satisfactory binder or matrix for the materials of the of the invention may be any of many well-known film forming resins and particularly those of the butadiene and/or styrene type. A typical binder of the styrene-butadiene type which has been used successfully in the practice of the present invention is one identified as "Pliolite" by the manufacturer thereof, Goodyear Tire and Rubber Co., Chemical Division, Akron, Ohio. Other satisfactory matrix materials are polystyrene, chlorinated rubber, polyvinylidene chloride, polyvinyl butyral and the like. Any suitable solvent for thinning the film forming resin or otherwise adjusting its miscibility and spreadability may be employed and a typically satisfactory solvent is toluene. It will be understood that neither the binder nor the solvent therefor are of critical importance since the primary purpose is to permit the sensitive material and the sensitization enhancing agent materials to be thoroughly mixed and then while still flowable to be supplied to a suitable substrate on which the binder may harden and form a relatively tough film in which the sensitive material and the sensitization enhancing materials are uniformly dispersed. Thus, the binder and the solvent function primarily in a physical manner to provide a support carrier or matrix for the sensitive material and the sensitization enhancing materials.

The sensitive materials suitable for use in the practice of the present invention appear to include materials which are classifiable as either photoconductive or photoemissive. As noted hereinbefore, they function for the purposes of the present invention in response to either photons, electrons or ions. In general, the sensitive materials for use in recording composition according to the invention include compounds formed by elements of Group II of the Periodic Chart of the Elements (hereinafter referred to as Group II elements) with elements of Group VI thereof (hereinafter referred to as Group VI elements). More particularly, the sensitive materials for use in the recording media of the invention include compounds such as the oxides of zinc, titanium, tantalum, indium, magnesium, germanium, tin, and bismuth, as well as sulfides of calcium zinc, cadmium and indium. In addition to these, it has been found that such compounds as boron nitride, calcium tungstate, beryllium aluminide, lithium carbonate, zinc carbonate, cadmium niobate, lithium niobate and certain phosphor compounds as calcium-magnesium silicate (cesium-activated) may also be employed. Mixtures of these compounds may also be used.

In formulating the recording materials and composition of the invention, the amount of the sensitization enhancing material incorporated in the film forming vehicle is not critical. Ratios of sensitization enhancing agent to sensitive material of from $10^{13}$ to $10^{14}$ have given excellent and substantially equivalent results with no discernible differences. Recording media with no sensitization enhancing materials have been found to exhibit no gain or improvement in molecular amplification whatever.

The sensitization enhancing materials suitable for use in the practice of the present invention are, in general, any of the metallic or metallo-organic compounds such as metallic halides and metallic acetylacetonates, and particularly the copper halides, copper (II) acetylacetonate, or bismuth trioxide ($Bi_2O_3$).

The material which renders the composition selectively hydrophobic is water or preferably a formaldehyde-water mixture, in approximately equal parts by weight, and in an amount of about $10^{12}$ grams per gram of photosensitive material. This material can be called the hydrophobicity inducing agent.

The sensitive material, the sensitization enhancing material are both in finely comminuted form. They are mixed together with the hydrophobicity inducing material, together with the desired binder and solvents (for example toluene) in an orbital ball mill until thorough dispersion of the hydrophobicity inducing agents, the solvent and the dry ingredients is achieved. The semifluid or viscous mixture is then applied to a suitable substrate by conventional knife-coating equipment so as to form a film thereon having a "wet" thickness of about 100 microns, for example. In general, the "dry" thickness of the film varies between 25 percent to 50 percent of the "wet" thickness of the film. Upon drying, the article is ready for use.

The coating is accomplished by the coater 30 onto the top surface of substrate 28. The coating is permitted to dry during passage around guide rolls 32 and 34, and if desired, a forced dryer can be incorporated. Since the composition is photosensitive, the coating is carried on in chamber 14 which has a light level sufficiently low that exposure does not take place.

The article, ready for exposure, passes through light trap 18 into chamber 16. In this chamber it is exposed by light source 36 which is powered by power supply 38. Light source 36 can be a conventional projector which projects an image upon the sensitive surface of the article, in which case the article 38 is held stationary for an adequate length of time, during exposure. On the other hand, light source 36 can be a scanning light beam which scans transversely of the direction or motion of article 38, in which case the advance of the article past the transversely scanning light source can be at an appropriate rate to provide the necessary spacing longitudinally of the article 38. A coating of the type described varies in sensitivity, but the coating given in example I below has an exposure range from unexposed to fully exposed from 100 ergs/cm.$^2$ to about 1,000 ergs/cm.$^2$.

The manner in which the composition is sensitive to light, or the manner in which it reacts to the photons, is not completely understood. However, the composition is completely hydrophobic before exposure to the minimum value given above, and is hydrophilic when given the full exposure. At the intermediate exposures, certain of the active sites are exposed, and render particular areas at the sites hydrophilic so that materials dispersed or dissolved in water are carried by the liquid to be deposited thereon.

After exposure, the article 38 passes through light trap 22, around guide rolls 40, 42 and 44, and thence out of the device 10 through light trap 24. Guide roll 42 submerges the active article, now rendered partially hydrophilic, in aqueous bath 46. Aqueous bath 46 either carries a dye solution or a colloidal dye or pigment in suspension so that when water adheres to the hydrophilic areas of the medium, the dye is deposited thereon. When rendered hydrophilic, the medium permits the adsorption and/or absorption of water therein, and the dissolved dye is moved into the medium to form an image in the selected area of the exposure. In the case of a colloidal dye suspended in water, the colloid is firmly attached to the surface in the hydrophilic areas so that it properly remains in place. Of course, the hydrophobic areas repel the water so there is no dye absorption or dye deposition. The dye step in chamber 20 thus acts as development of the latent image formed as selective hydrophilic areas at the exposed areas.

As the article comes out of light trap 24, it is ready for inspection. The material coming from device 10 can represent printed words or half tones, and thus the complete range necessary for the transmission of intelligence is available. The following example is intended to illustrate the preparation and the novel recording composition of the invention, its exposure and its development and not to restrict the scope thereof.

EXAMPLE I

A recording tape designated 0202 according to the invention was prepared by adding 50.4 grams of ZnO, 0.108 gram of CuCl, 18 grams of "Pliolite S-7" (30 percent solids), 58 ml. of toluene, 4 ml. of methanol and 8 ml. of formaldehyde (37.1 percent of formaldehyde, 12 percent methanol, rest water) together in an orbital ball mill French process zinc oxide having a New Jersey Zinc Company brand name of Photox 801 was used.

The materials were milled together from 45 minutes to about 1.5 hours using 10mm. Agate balls. The weight ratio of ZnO to binder was 2.8. Thereafter a film of the composition was applied by a knife-coater at a speed of 2 to 2.5 cm./sec. onto an aluminized polyester film substrate. The wet thickness was of the order of 100 microns, resulting in a dry film thickness of about 25 microns. Latent image or nucleation sites were subsequently produced with electrons or photons. Exposure may be immediate or may be delayed until up to one year after coating. Exposure was accomplished in from 1 to 30 seconds, depending upon the strength of the light source and the density of the negative employed to form an image so that an exposure of 100–1,000 ergs/centimeters$^2$ using a wavelength of 3,600–3,700 angstroms was accomplished. Development may consist of an approximately 1-second surface application of a water suspension of colloidal graphite or suitable dyes. The graphite developer is made by dispersing 83 grams of Acheson Coloids "Aquadag (22 percent Solids in Water)" in 1 liter of deionized water; the alkalinity may be adjusted with ammonia or acetic acid to produce alkalinity anywhere in the pH range from pH 8 to 11 (the higher pH producing more rapid, but less selective, development). The developed images were sharp and found to have a resolving power comparable to printed materials.

The manner in which the photosensitive composition described above can be employed, also includes the concept of permitting the selected areas of hydrophobicity and hydrophilicity to permit water carried materials to pass through the hydrophilic areas to act upon the substrate below the composition. Thus, compositions of the type described can be coated upon metallic substrates, and after exposure, subjected to etching by aqueous solution, so that the etching only takes place through the composition in the hydrophilic areas.

Figure 2:
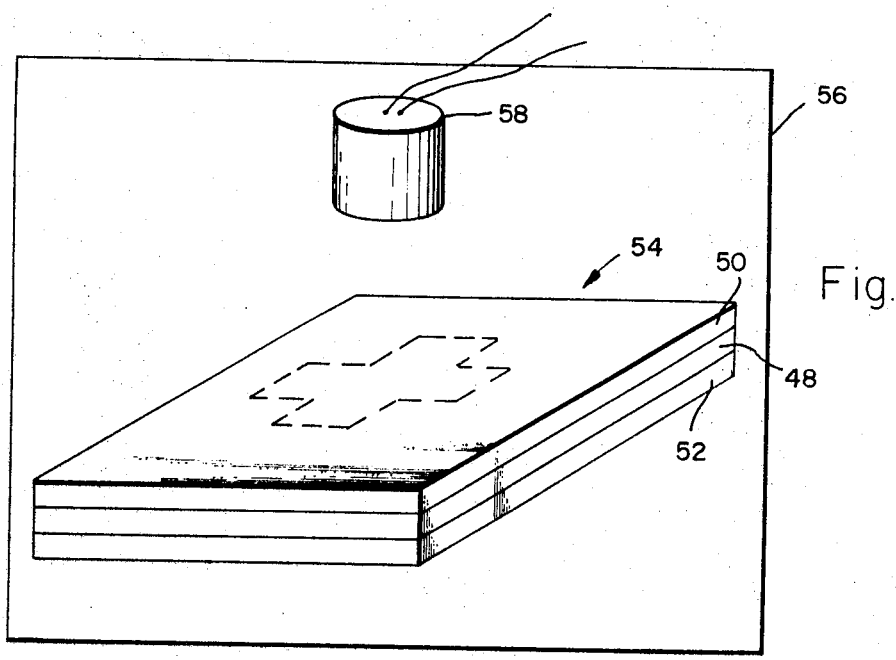
FIG. 2 is a schematic illustration of the exposure of a photon sensitive composition as the first step in a step process employing a selective area photon sensitive medium.

Referring to FIG. 2, an etchable metal 48 is coated with a layer of composition 50. Composition 50 is the same composition described in the above examples. If desired, the etchable metal 48 may be mounted upon a base 52, or may be self supporting. This assembly 54 is enclosed within a light tight chamber 56 in order to prevent the inadvertent exposure of areas which are intended to remain hydrophobic. Photon source 58 is positioned so that it can selectively expose areas of the medium 50 of assembly 54. Photon source 58 may either be an ordinary projector or it may be a scanning light beam. In the case of a scanning light beam, suitable drive is necessary to cause the light beam of scanning photon source 58 to expose the desired areas. In the case of a projector, a suitable mask or negative is located in the photon source 58 to expose only the desired areas. In the present case, the cross indicated in dashed lines in the center of the article is exposed. Thus, the cross becomes hydrophilic while the remaining area remains hydrophobic, to ordinary water suspensions and solutions. However, the exposure hardens or makes more impermeable the exposed area so that the two areas act differently to some materials.

Subsequent to exposure, the assembly 54 is placed, as shown in FIG. 3, in an aqueous etchant solution 69 of such nature as to etch the etchable metal 48. When the metal 48 is aluminum, a commercially available etch known as "Cuposit 328," manufactured by Shipley Company, Inc., Newton, Massachusetts, is suitable. The etchant 60 is retained in etch tank 62 which in turn is positioned in lighttight chamber 64 to prevent inadvertent exposure of the cross in the center prior to the completion of etching. "Cuposit 328" wets the entire surface, but due to the different permeability of the two areas, the aqueous etchant solution works through the unexposed portion of the layer of composition 50 so that upon completion of etching, the metal under the unexposed area is etched, but the composition 50 remains over the entire top surface.

After completion of etching, the composition 50 is dissolved off by a suitable solvent therefor, for example toluene, to result in the finished structure shown in FIG. 4 wherein the exposed portion is unetched while the unexposed portion is etched. In the finished part 66, the entire area which had an unexposed cover layer of composition 50 is etched away down to the base 52, but in the exposed portions, the metal 48 remains in the form of the exposed selective area. Thus, the latent image formed by selective area projection by photon source 58 is developed by etching away the unexposed area to from a physical image of the character of the latent image. Thus, process of selective etching is directly useful in the preparation of printing plates, and in chemical etching for the purpose of shaping structural parts.

EXAMPLE II

Aluminum coated mylar is knife-coated with a sensitive material of the type given in example I and subsequently selectively exposed to the desired radiation, (e.g., 3,625 angstroms from a mercury lamp). Following exposure, the sample is immersed in a solution known as "Cuposit 328," manufactured by Shipley Company, Inc., Newton, Massachusetts. This solution attacks the aluminum selectively through the unexposed areas. Thus an etched image results after the coating is removed by toluene or acetone wash.

This invention having been described in its preferred embodiment, it is clear that it is susceptible to numerous modifications and changes within the ability of those skilled in the art and without the exercise of the inventive faculty. Accordingly, the scope of this invention is defined by the scope of the following claim.

What is claimed is:

1. A composition which has selective area sensitivity to materials disposed in aqueous media in accordance with photon exposure, said composition comprising:
    a film-forming resinous binder;
    a sensitive material dispersed in said binder, said sensitive material being selected from the group consisting of photoconductive materials and photoemissive materials, and being selected from the group consisting of oxides of zinc, titanium, tantalum, indium, magnesium, germanium, tin bismuth, the sulfides of calcium, zinc, cadmium, indium, and boron nitride, calcium tungstate, beryllium aluminide, lithium carbonate, zinc carbondate, cadmium niobate, lithium niobate and cesium activated calcium-magnesium silicate;
    a sensitization-enhancing material dispersed in said binder, said sensitization-enhancing materials being selected from the group consisting of of metallic halides and metallic acetylacetonates; and formaldehyde-water mixture dispersed in said binder in an amount effective to act as a hydrophobicity-inducing agent in said compostion is hydrophobic except in those areas where the composition is photon-exposed.

2. The composition of claim 1 wherein the sensitization-enhancing material is selected from the group consisting of copper halides and copper (II) acetylacetonate.

3. A composition which has selective area sensitivity to materials disposed in aqueous media in accordance with photon exposure, said medium comprising:
    a styrene-butydiene binder;
    photosensitive zinc oxide dispersed in said binder as a sensitive material;
    copper chloride dispersed in said binder as a material for enhancing the photon sensitivity of the composition; and
    a water-formaldehyde mixture dispersed in said binder in an amount effective to induce hydrophobicity of said composition except in those areas where said composition is photon-exposed.

PO-1050
(5/69)

UNITED STATES PATENT OFFICE
CERTIFICATE OF CORRECTION

Patent No. 3,615,559            Dated October 26, 1971

Inventor(s) Alfred F. Kaspaul, Erika E. Kaspaul

It is certified that error appears in the above-identified patent and that said Letters Patent are hereby corrected as shown below:

Column 1, line 18, delete "from" and insert --for--. (page 2, line 13)

Column 2, line 16, delete "medium" and insert --composition--. (page 4, line 23)

Column 2, line 67, after "are", insert --dispersed--. (page 6, line 14)

Column 2, lines 71 and 72, delete "of the" (second occurrence). (page 6, line 17)

Column 3, line 45, delete "$10^{13}$ to $10^{14}$" and insert --$10^{-3}$ to $10^{-4}$--. (page 8, line 6)

Column 3, line 60, delete "$10^{12}$" and insert --$10^{-2}$--. (page 8, line 19)

Column 4, line 58, delete "0202" and insert --#202--. (page 11, line 2)

Column 5, line 47, delete "69" and insert --60--. (page 12, line 25)

Column 6, line 44, after "and", insert --a--. (Amendment dated 7/30/70, page 5, line 18)

Column 6, line 47, after "said composition", insert --so that said composition--. (Amendment dated 7/30/70, page 5, line 20).

Signed and sealed this 18th day of April 1972.

(SEAL)
Attest:

EDWARD M. FLETCHER, JR.
Attesting Officer

ROBERT GOTTSCHALK
Commissioner of Patents